United States Patent
Kirst et al.

(10) Patent No.: US 11,715,940 B2
(45) Date of Patent: Aug. 1, 2023

(54) CIRCULAR CUTTING UNIT AND DRIVE FOR MULTILAYER WIRE

(71) Applicant: Komax Holding AG, Dierikon (CH)

(72) Inventors: Michael A. Kirst, Pewaukee, WI (US); Richard Schwartz, Pewaukee, WI (US); Dieter Vischer, Zug (CH)

(73) Assignee: Komax Holding AG, Dierikon (CH)

( * ) Notice: Subject to any disclaimer, the term of this patent is extended or adjusted under 35 U.S.C. 154(b) by 247 days.

(21) Appl. No.: 17/341,987

(22) Filed: Jun. 8, 2021

(65) Prior Publication Data

US 2022/0393447 A1 Dec. 8, 2022

(51) Int. Cl.
*H02G 1/12* (2006.01)
*B26D 7/26* (2006.01)

(52) U.S. Cl.
CPC ......... *H02G 1/1265* (2013.01); *B26D 7/2635* (2013.01); *B26D 2007/2671* (2013.01)

(58) Field of Classification Search
CPC .... H02G 1/1265; H02G 1/1268; H02G 1/127; B26D 7/2635; B26D 2007/2671
USPC .................. 81/9.4, 9.51; 30/90.1–90.3, 91.2, 30/90.6–90.9, 91.1
See application file for complete search history.

(56) References Cited

U.S. PATENT DOCUMENTS

| | | | |
|---|---|---|---|
| 5,010,797 A | 4/1991 | Stepan | |
| 7,597,030 B2 | 10/2009 | Stepan et al. | |
| 8,438,952 B2 * | 5/2013 | Locher ................. | H02G 1/1265 81/9.51 |
| 10,819,093 B2 | 10/2020 | Appenzeller | |
| 11,362,492 B2 * | 6/2022 | Houser ................. | H02G 1/1265 |
| 11,462,892 B2 * | 10/2022 | Sugawara ............ | H02G 1/1268 |
| 11,557,885 B2 * | 1/2023 | Backenstoes ............ | B26D 3/08 |
| 2020/0303910 A1 | 9/2020 | Houser et al. | |

FOREIGN PATENT DOCUMENTS

| | | |
|---|---|---|
| CN | 110707608 A | 1/2020 |
| DE | 202008017576 U1 | 3/2010 |
| JP | 2018019545 A | 2/2018 |
| WO | 2005046015 | 5/2005 |
| WO | 2010061303 | 6/2010 |
| WO | 2020119916 | 6/2020 |

OTHER PUBLICATIONS

Extended European Search Report for European Application No. 22177528.1 dated Nov. 3, 2022.

* cited by examiner

*Primary Examiner* — Phong H Nguyen
(74) *Attorney, Agent, or Firm* — Andrus Intellectual Property Law, LLP (57) ABSTRACT

A circular cutting unit for partially cutting one or more layers of a cable or wire along a cutting plane. The circular cutting unit include a knife head including a drive disc and an adjustment disc that are each rotatable about a disc axis. A pair of knife holders that each include a knife blade are pivotally mounted to the drive disc. Relative rotation of the adjustment disc relative to the drive disc causes the knife holders to pivot causing movement of the knife blades toward or away from each other. The circular cutting unit includes a primary drive assembly and an adjustment drive assembly that are each separately operable. The primary drive assembly rotates the knife head at the cutting speed and the adjustment drive assembly rotates the adjustment disc relative to the drive disc.

20 Claims, 13 Drawing Sheets

CIRCULAR CUTTING UNIT AND DRIVE FOR MULTILAYER WIRE

BACKGROUND

The disclosed system generally relates to a circular cutting unit and drive mechanism that is configured for partial cutting of a wire or cable, and in particular a wire or cable with a multilayer structure such as a coaxial cable.

Cables, in particular those with a multilayer structure such as coaxial cables, are separated in a conventional manner with devices that comprise several knives or knife blades. The knives rotate together around the cable axis on a circular cutting unit. In the stripping process of such a multi-layered cable, only a defined amount of the layers must be cut. If a coaxial cable, which is an example of a multi-layered cable, for example from inside to outside from the inner conductor, dielectric, shield and sheath is constructed, then the knives must be guided, for example, so that they selectively cut the sheath without injuring the screen, or be guided in such a way that the knives selectively cut the sheath, the screen and the dielectric without injuring the inner conductor.

From WO 2005/046015 A1 and DE 20 2008 017 576 U1 round cutting units are known. In the prior art, the respective knives are moved by twisting a first disc and a second disc relative to each other. At or in one disc, the knives are mounted movably, while a bolt attached to the respective knife intervenes in a groove in the second disc.

If the first and second discs do not have the same speed, the blades move in the cutting plane, i.e. towards or away from the cable. Until the first disc and the second disc have assumed the desired relative angular difference, they must rotate at exactly the same angular velocity. This is fraught with great uncertainties. There is a need for a reliable cutting unit that is simple and allows a precise cutting process.

SUMMARY

The present disclosure relates to a circular cutting unit for partially cutting one or more layers of a cable or wire. More specifically, the present disclosure relates to a circular cutting unit that includes primary and adjustment drive units operable to rotate a knife head at a cutting speed and to adjust the position of a pair of knife blades to control the depth of cutting.

One aspect of the present disclosure is relates to the circular cutting unit. The circular cutting unit is configured to partially cut one or more layers of a cable or wire along a cutting plane. The cable is defined by its cable axis. The cutting plane runs approximately perpendicular to the cable axis. The circular cutting unit has a knife head including a pair of knife holder, a drive disc and an adjustment disc. Each knife holder has an integrated adjustment groove and is designed to hold a knife blade. The drive disc is mounted to rotate around a disc axis that runs approximately parallel to the cable axis. The adjustment disc is also mounted to rotate around the disc axis. The adjustment disc is also configured to act on the adjustment groove of the knife holder. An angle is defined between the discs mounted on the common disc axis, i.e. the adjustment disc and the drive disc. The action of the adjustment disc on the adjustment groove is carried out in accordance with the present disclosure in such a way that a change of the angle between the drive disc and the adjustment disc causes a movement of the knife blades in the cutting plane.

The described configuration facilitates a synchronous rotation of the drive disc and the adjustment disc around the disc axis, or drive axis. This makes it easy to precisely approach the blades to an inserted cable and to selectively cut the desired layers.

In embodiments of the present disclosure, the adjustment groove in each knife holder is arc-shaped. Alternatively or additionally, the adjustment groove is formed to match a circular arc, which describes an associated section of the adjustment disc. For example, an adjusting member is provided on the adjustment disc, and the adjusting element moves along the adjustment groove.

In embodiments of the present disclosure, the circular cutting unit includes a primary drive assembly. The primary drive assembly is coupled to the drive disc by means of a transmission device for a drive force and is configured to drive the drive disc. The primary drive assembly is also coupled to the adjustment disc by means of a transmission device for an adjustable force. For example, the transmission device coupled with the drive disc is a drive belt and the transmission device coupled with the adjustment disc is an adjustment belt. The primary drive assembly is configured to drive the drive disc at a cutting speed and to drive the adjustment disc at the same cutting speed. During cutting, the angle between the adjustment disc and the drive disc is constant. In an adjustment period, the angle between the adjustment disc and the drive disc is changed. This change moves the knife blades in the cutting plane. In the adjustment period, the angular position of the adjustment disc is adjusted relative to the drive disc.

The circular cutting unit includes an adjustment drive assembly that is operable to adjust the angular position between the adjustment disc and the drive disc. Typically, there is an open blade position in which the knife blades are further away from the cable axis as an external circumferential position of the cable sheath of an inserted cable. In other words, in the open blade position, the blade does not touch the cable sheath (an outer layer of a multi-layer coaxial cable). Further there is a closed blade position. In the closed blade position, the knife blades are approximately in the area of the cable axis. In other words, in the closed blade position, the knife blade—or a cutting surface of the knife blade—is in contact with the outer layer or layers of the cable or wire being processed.

The circular cutting unit of the present disclosure is operable to cut a cable or wire along a cutting plane that is perpendicular to a cable axis. The cutting unit includes a drive disc and an adjustment disc that are both rotatable about the cable axis. The drive disc includes a pair of knife holders pivotally mounted to the drive disc. Each of the knife holders can include an adjustment groove that is formed in the body of the knife holder and has a substantially arc shape.

The adjustment disc includes a pair of adjusting elements that are each received in one of the adjustment grooves. During operation, the position of the adjustment disc can be adjusted relative to the drive disc to cause the movement of the knife blades in the cutting plane toward or away from each other.

The circular cutting unit can include a primary drive assembly that rotates both the drive disc and the adjustment disc at the cutting speed. An adjustment drive assembly is separately operable to modify the position of the adjustment disc to cause movement of the knife blades in the cutting plane toward or away from each other.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
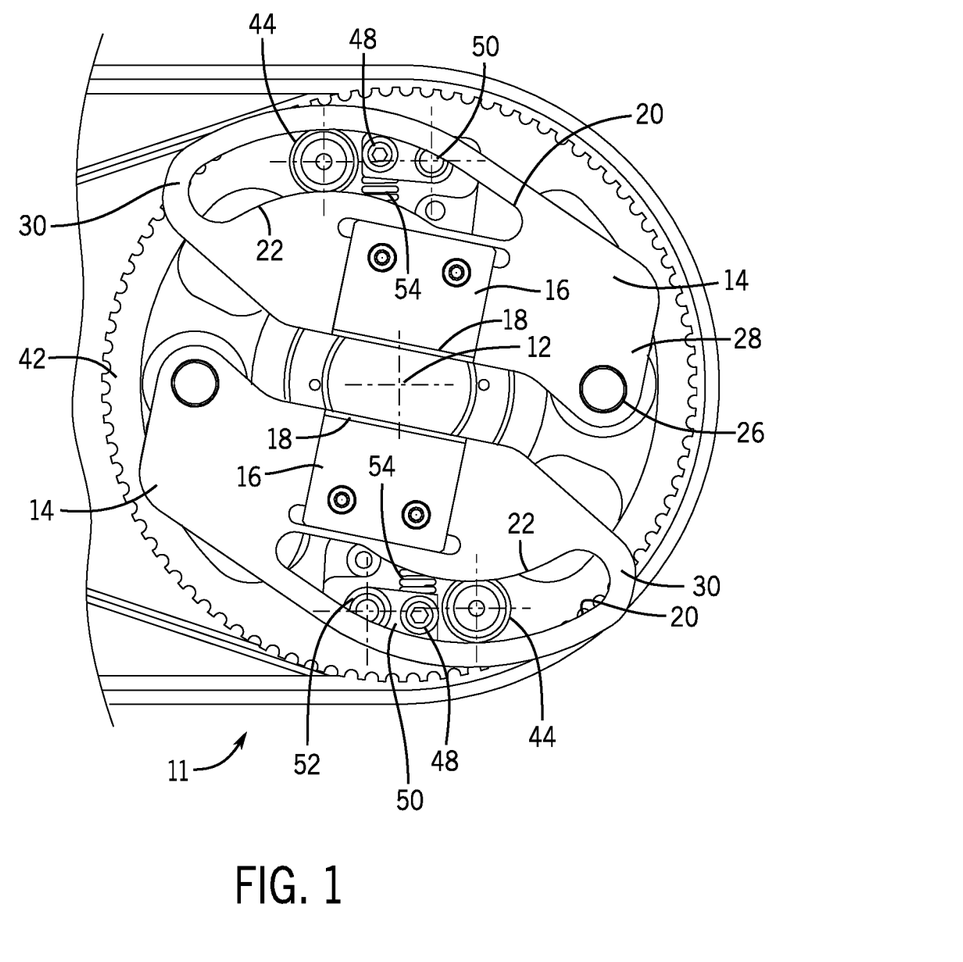
FIG. 1 is a side view of the knife head of the circular cutting unit constructed in accordance with an exemplary embodiment of the present disclosure.
Figure 2:
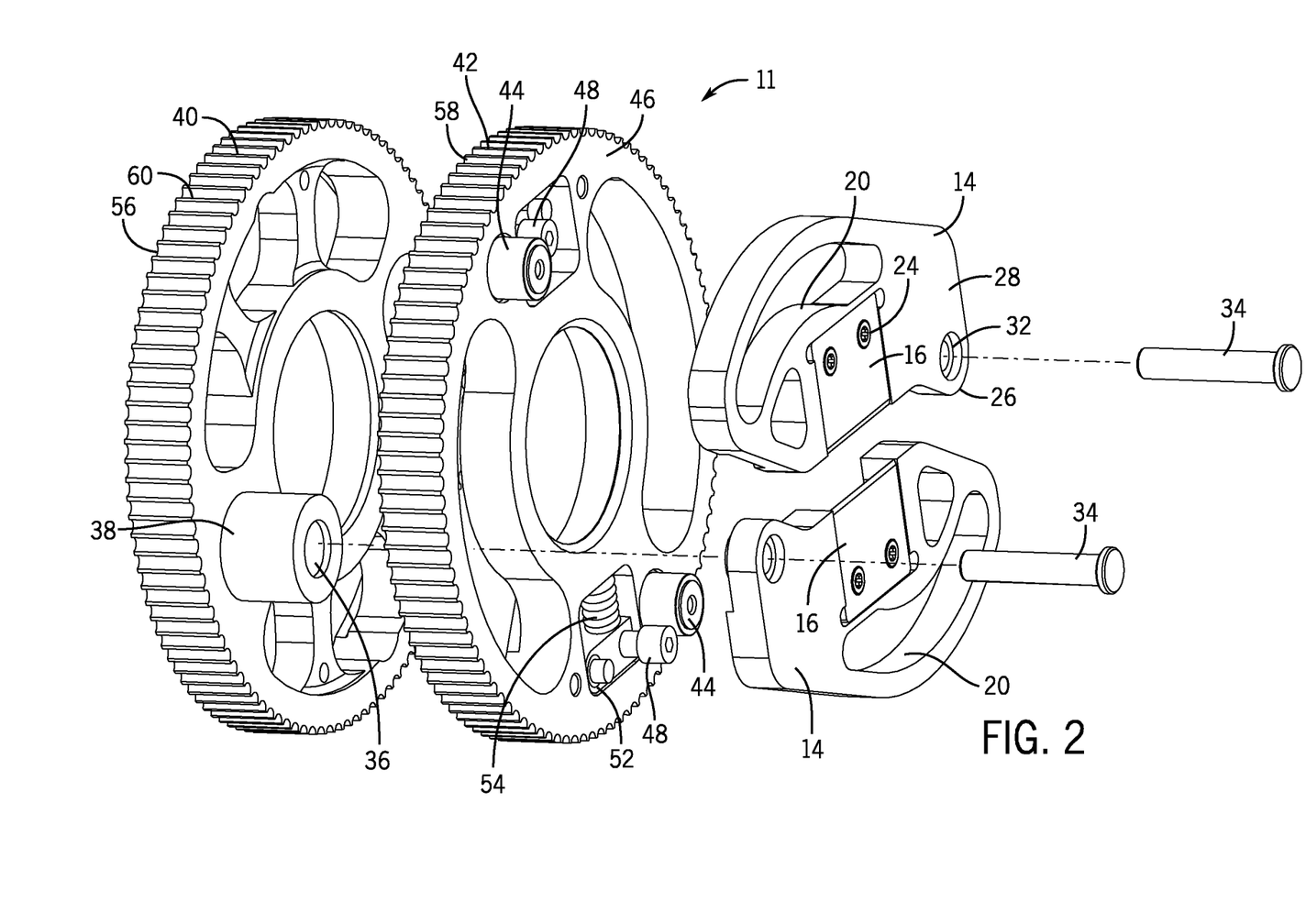
FIG. 2 is an exploded view of the knife head of the circular cutting unit.

FIGS. 1 and 2 illustrate portions of a circular cutting unit constructed in accordance with the present disclosure. The circular cutting unit includes a knife head 11 that is configured to rotate about a cable axis 12 and to selectively cut through one or more layers of a cable being processed. The knife head 11 shown in FIGS. 1 and 2 is coupled to a primary drive assembly such that the knife head 11 rotates about the cable axis 12 at a cutting speed. The details of the primary drive assembly will be described in much greater detail below.

As illustrated in FIG. 1, the knife head 11 includes a pair of knife holders 14 that each are designed to receive and retain a knife blade 16. Each knife blade 16 includes a cutting edge 18 that is used to cut through one or more layers of a wire or cable as the knife head 11 rotates about the cable axis 12. The pair of knife blades 16 are located on opposite sides of the cable axis 12 and are each movable along a cutting plane that is perpendicular to the cable axis 12. The pair of knife holders 14 are designed such that the position of the knife holders 14 relative to each other can be adjusted such that the distance between the cutting edges 18 of the pair of knife blades 16 can be adjusted. The distance between the pair of cutting edges 18 defines the depth of cut when the knife head 11 is being used to cut one or more layers from either a wire or cable that extends along the cable axis 12.

Referring again to FIGS. 1 and 2, each of the knife holder 14 includes an adjustment groove 20. As illustrated, the adjustment groove 20 has an overall arcuate shape that is defined by an inner guide surface 22. The shape of the adjustment groove 20 is designed to create linear movement of the knife blades 16 during movement of the knife holders 14 as will be described below.

Each of the pair of knife holders 14 is formed from a durable metal material. As illustrated in FIG. 2, each of the knife blades 16 is attached to the respective knife holder 14 by one or more connectors 24, which can be screws, rivets or other connectors that are able to secure the knife blade 16 in place along the knife holder 14 while allowing the knife blade 16 to be removed and replaced when desired.

Each of the pair of knife holders 14 includes an attachment ear 26 that is formed on a first end 28 of the knife holder 14. An opposite, outer second end 30 of the knife holder 14 includes the terminal end of the adjustment groove 20. As best shown in FIG. 2, the attachment ear 26 includes an opening 32 that is sized to receive a pivot pin 34. The pivot pin 34 extends through the opening 32 and is received within a receiving opening 36 formed in an extending hub 38 formed as part of a drive disc 40. The drive disc 40 includes a pair of hubs 38 that each receive one of the pair of pivot pins 34 such that each of the pair of knife holders 14 are pivotally mounted to the drive disc 40.

As can be understood in FIG. 2, the knife head 11 further includes an adjustment disc 42 that is located between the drive disc 40 and the pair of knife holders 14. The adjustment disc 42 includes a pair of adjusting elements 44 that each protrude past an outer face 46 of the adjustment disc 42. In the embodiment illustrated in FIGS. 1 and 2, each of the adjusting elements 44 is a roller that includes an outer surface that rotates about a fixed center portion. However, the adjusting element 44 could be any one of multiple different types of components other than the roller shown in FIG. 2. As an example, the adjusting element 44 could be a fixed circular protrusion having a wear resistant outer surface.

As illustrated in FIG. 1, when the drive disc 40 and adjustment disc 42 are assembled together, the adjusting elements 44 are each received within one of the adjustment grooves 20. As will be described in greater detail below, movement of the adjustment disc 42 relative to the drive disc 40 causes the adjusting element 44 to move along the adjustment groove 20. Since the adjustment groove 20 has an arcuate shape, the movement of the adjusting element 44 within the adjustment groove 20 causes the pair of knife blades 16, and thus the cutting edges 18, to move toward or away from each other depending upon the direction of movement of the adjusting element 44 within the adjustment groove 20. The movement of the adjusting elements 44 within the adjustment grooves 20 is controlled by the relative rotational movement of the adjustment disc 42 relative to the drive disc 40.

Although one embodiment of the knife holders 14 is shown in which the knife holders 14 are each pivotable about one end and include an arcuate adjustment groove to direct the movement, other embodiments of the knife holders are contemplated. For example, the knife holders could be configured such that the knife holders move in a linear direction along a groove or track toward and away from the cable being cut. The movement of the knife holders could be controlled by a cam or other similar element on the adjustment disc 42. In the contemplated alternate configuration, each of the knife blades would move in a linear manner toward and away from each other in the cutting plane as in the embodiment shown and described.

Referring back to FIG. 2, in addition to the adjusting element 44, the adjustment disc 42 includes a pair of support rollers 48 that are positioned adjacent to the adjusting element 44. Each of the support rollers 48 is mounted to a bracket 50 that is pivotally mounted at a pivot end 52. The opposite end of the bracket 50 is connected to a bias spring 54. The bias spring 54 is configured to press the support roller 48 into contact with the guide surface 22 of the adjustment groove 20 to help eliminate the mechanical play that could be present between the knife holder 14 and the adjusting element 44.

The outer circumference 56 of the drive disc 40 and the outer circumference 58 of the adjustment disc 42 both include a series of teeth 60. The number of teeth on both the drive disc 40 and the adjustment disc 42 are the same. The outer circumference of both of the drive disc and the adjustment disc are identical such that when the drive disc 40 and the adjustment disc 42 are connected to a primary drive assembly through a pair of separate pulley belts, the drive disc 40 and the adjustment disc 42 rotate at the same rotational speed.

Figure 3:
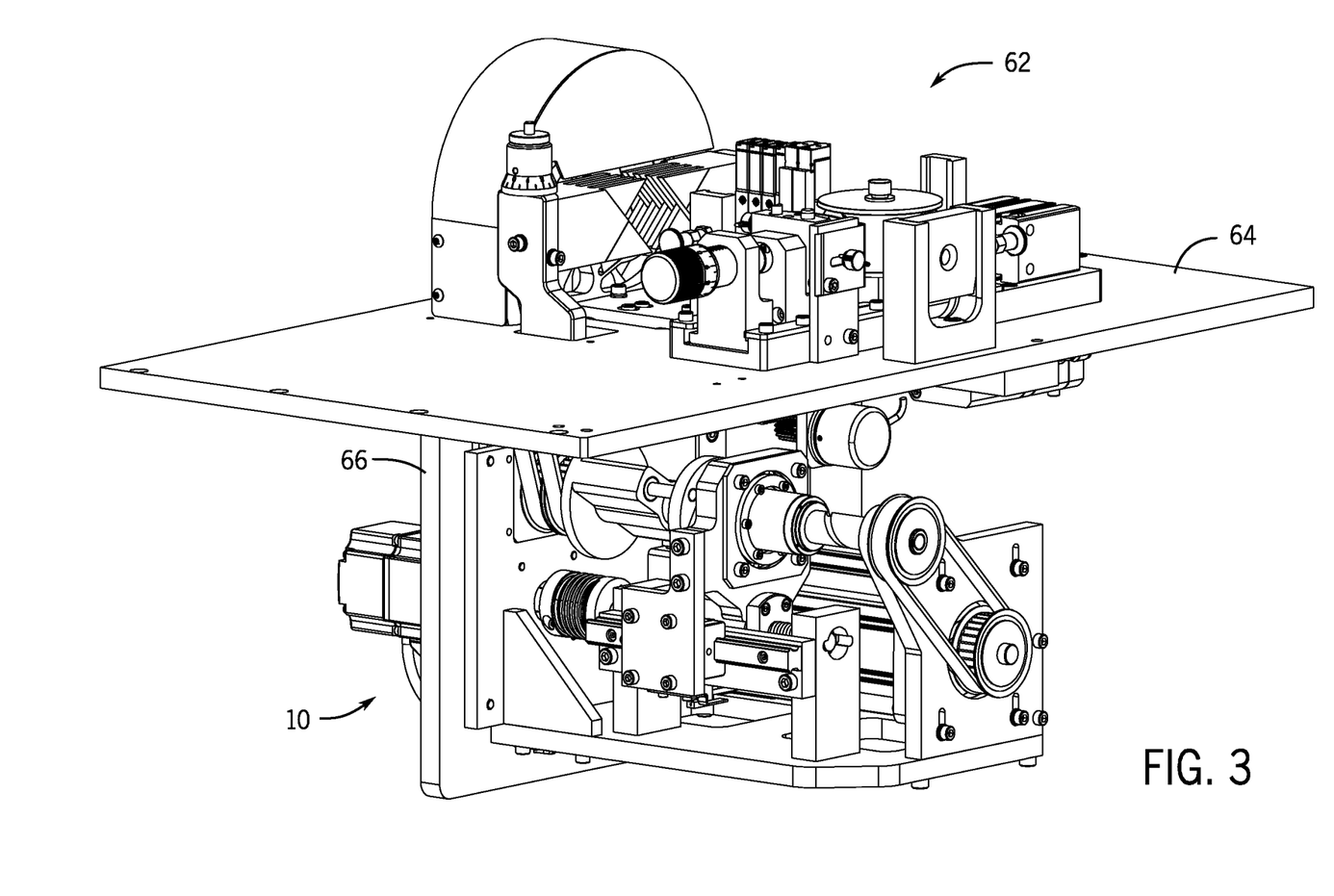
FIG. 3 is a rear perspective view of a wire processing system including the circular cutting unit.

FIG. 3 illustrates the inclusion of the circular cutting unit 10 of the present disclosure as part of a larger wire processing system 62. The larger wire processing system 62 shown in FIG. 3 includes various wire processing equipment that feeds a wire or cable for cutting utilizing the circular cutting unit 10 of the present disclosure. The types of wire processing equipment can vary depending upon the specific wire processing process being carried out. The wire processing equipment can include wire cutting units, wire stripping units, wire feeding units and others. In the embodiment shown in FIG. 3, the components of the wire processing system 62 are mounted to a support wall 64 which also provides a mounting location for the support frame 66 of the circular cutting unit 10.

Figure 4:
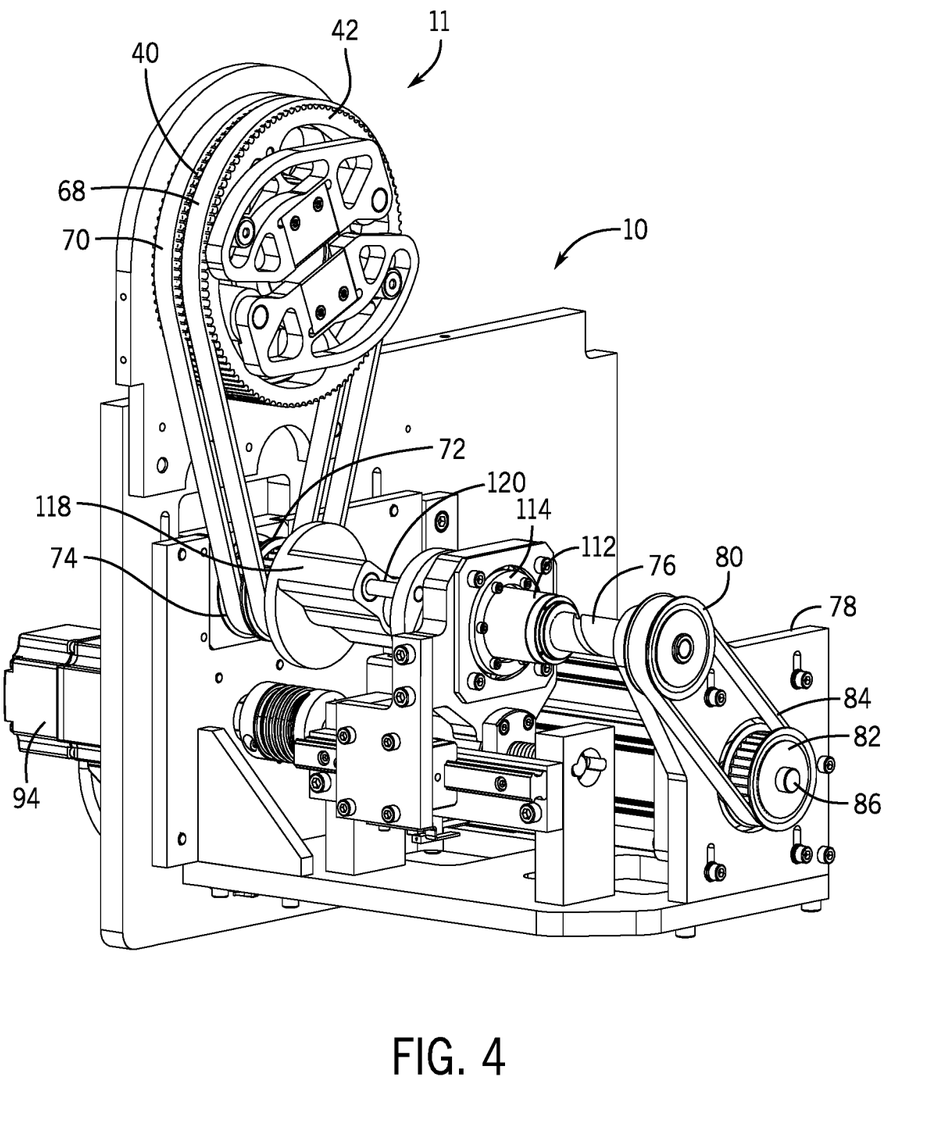
FIG. 4 is a front perspective view of the circular cutting unit.
Figure 5:
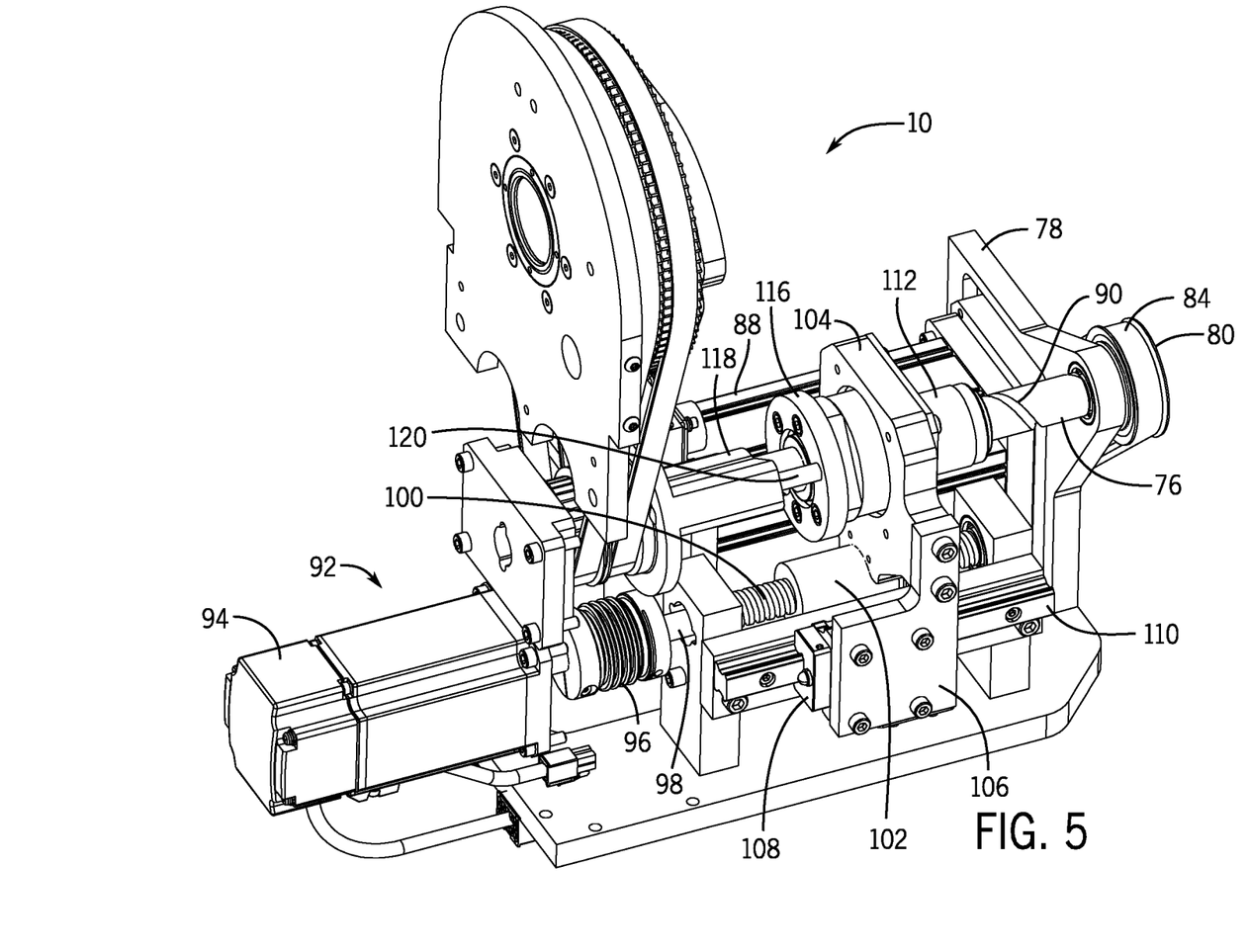
FIG. 5 is a perspective view showing the primary drive assembly and the adjustment drive assembly.
Figure 6:
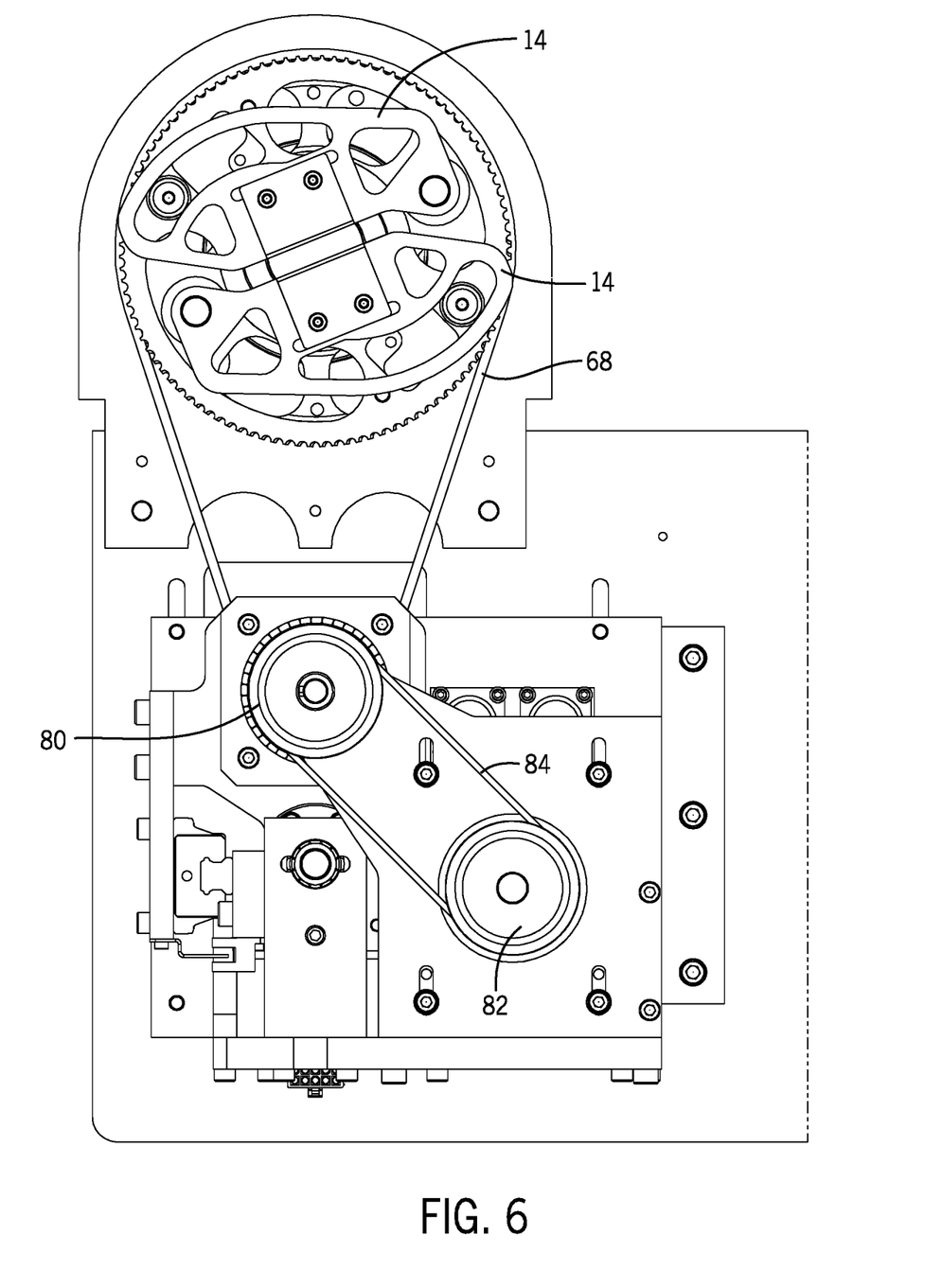
FIG. 6 is an end view of the circular cutting unit.

FIGS. 4 and 5 further illustrate the construction and components that form the circular cutting unit 10 of the present disclosure. As shown in FIG. 4, both the adjustment disc 42 and the drive disc 40 of the knife head 11 are connected to a primary drive assembly by a pair of pulley belts 68 and 70. The pulley belt 68 is coupled to the outer circumference of the adjustment disc 42 while the pulley belt 70 is coupled to the outer circumference of the drive disc 40. The pulley belt 68 is further entrained around an adjustment pulley 72 while the pulley belt 70 is entrained around a drive pulley 74. Both the adjustment pulley 72 and the drive pulley 74 are rotatably connected to a primary drive shaft 76. The primary drive shaft 76 extends through a motor mounting plate 78 and is connected to an idler pulley 80. The idler pulley 80, in turn, is connected to a primary drive pulley 82 through a pulley belt 84.

The primary drive pulley 82 is securely connected to a motor shaft 86 of a primary drive motor. As illustrated best in FIG. 5, the primary drive motor 88 is mounted to the motor mounting plate 78. The primary drive motor 88 is preferably an electric motor that is operable to rotate the primary drive pulley 82 at a controllable speed. The rotation of the primary drive pulley 88 rotates the idler pulley 80 through the pulley belt 84. The idler pulley 80, in turn, rotates the primary drive shaft 76 which is coupled to both the adjustment pulley 72 and the drive pulley 74. Since the adjustment pulley 72 and the drive pulley 74 are both connected to the drive disc 40 and the adjustment disc 42, during normal operation, the rotating speed of both of the drive disc 40 and the adjustment disc 42 are controlled by operation of the primary drive motor 88. When the pair of knife blades are in the desired position relative to each other to perform a cutting operation, the primary drive motor 88 controls the rotational speed of the drive disc 40 and the adjustment disc 42 to cut through the desired layers of a cable or wire.

As can be seen in FIGS. 4 and 5, the primary drive shaft 76 includes a spiral groove 90 formed in its outer surface. The spiral groove 90 extends along the length of the primary drive shaft 76 and is used to adjust the rotational speed of the adjustment pulley 72 in a manner which will be described in greater detail below.

Referring again to FIGS. 4 and 5, the circular cutting unit 10 further includes an adjustment drive assembly 92 that is operable to adjust the position of the adjustment disc 42 relative to the drive disc 40. The adjustment drive assembly 92 includes an adjustment drive motor 94 that includes a motor shaft received by a shaft coupler 96. In the embodiment illustrated, the adjustment drive motor 94 is an electric motor. The shaft coupler 96 provides a coupling between the drive shaft of the adjustment drive motor 94 and an adjustment shaft 98. The adjustment shaft 98 includes a threaded outer surface 100. The threaded outer surface 100 is received within an internally threaded barrel 102 formed as part of an adjustment bracket 104. The adjustment bracket 104 further includes a guide plate 106 having a slide block 108 that is designed to move linearly along a guide rail 110. The slide block 108 and guide rail 110 provide stabilization for the adjustment bracket 104 during movement of the adjustment bracket 104. In other embodiments, the guide plate 106, slide block 108 and guide rail 110 could be eliminated if stabilization is not required. As can be understood in FIGS. 4 and 5, when the adjustment drive motor 94 operates, rotation of the motor shaft causes rotation of the adjustment shaft 98 through the shaft coupler 96. Since the outer surface 100 of the adjustment shaft 98 is threaded, the rotational movement of the adjustment shaft 98 causes the entire adjustment bracket 104 to move in a linear manner along the guide rail 110. The direction of movement of the adjustment bracket 104 is controlled by the direction of operation of the adjustment drive motor 94.

Figure 7:
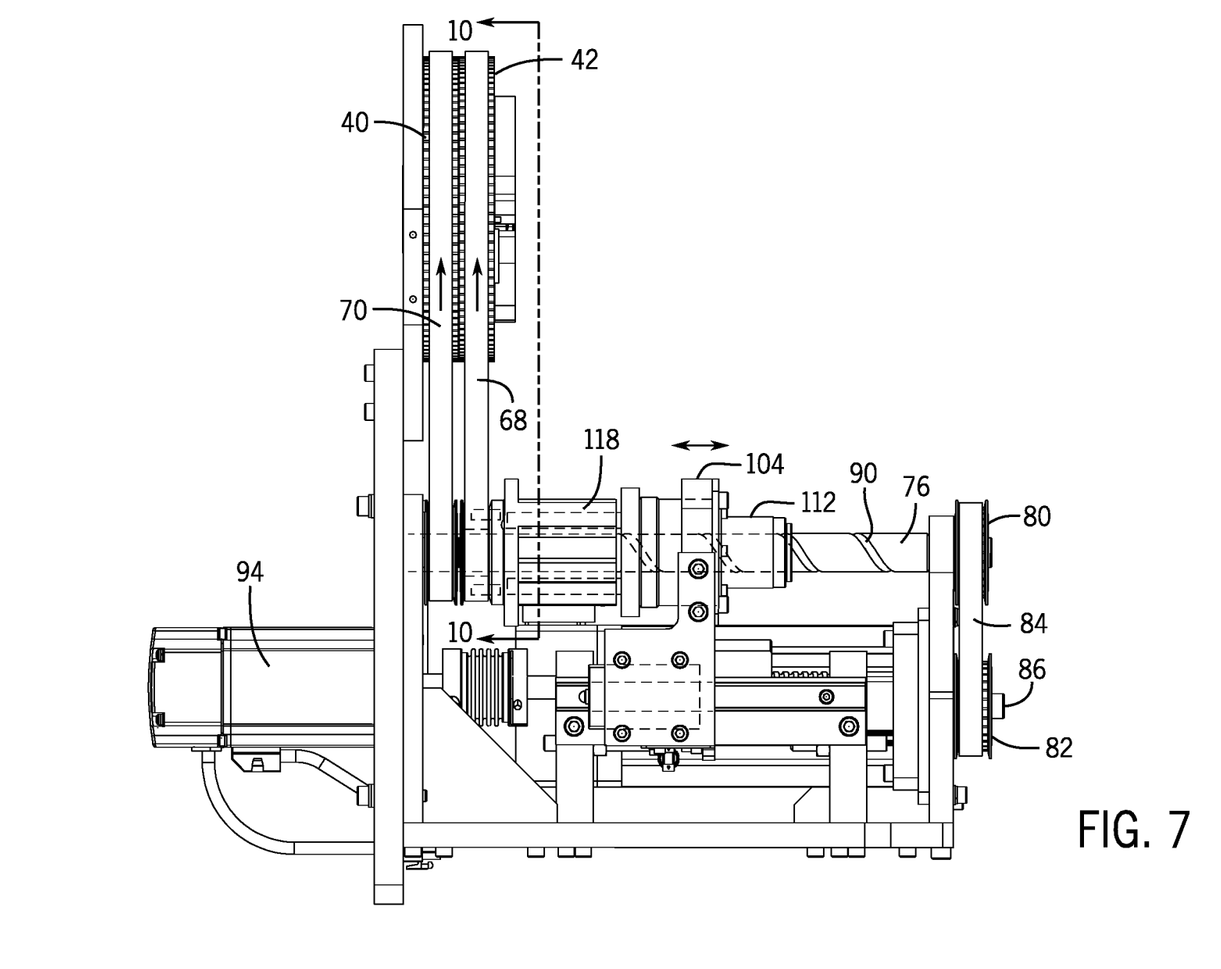
FIG. 7 is a top view showing the interconnection between the knife head and the primary drive assembly of the circular cutting unit.

Referring now to FIG. 7, the adjustment bracket 104 provides rotational support for a ball nut 112. The ball nut 112 is rotatably supported by a bearing retainer 114 shown in FIG. 4. The ball nut 112 includes an internal pin or ball that is received within and travels along the spiral groove 90. Thus, when the adjustment bracket 104 moves in the linear direction shown by the arrow in FIG. 7, the linear movement of the ball nut 112 causes the ball nut 112 to rotate within the bearing retainer 114 due to the movement of the internal pin or ball along the helical groove 90.

Referring back to FIG. 5, the portion of the ball nut 112 that extends through the adjustment bracket is joined to a rod holder 116. The rod holder 116 is connected to a pulley driver 118 through a pair of support rods 120. As can be seen in a comparison between FIGS. 7 and 8, the support rods 120 are press fit into the rod holder 116 and move into and out of the pulley driver 118 as the ball nut 112 moves along the drive shaft 76. The pulley driver 118 is securely connected to the adjustment pulley 72. In this manner, as the entire adjustment bracket 104 moves linearly as indicated by the arrow in FIG. 7, the linear movement of the adjustment bracket 104 causes rotational movement of the ball nut 112. The rod holder 116 joined to the ball nut 112 imparts rotation to the pulley driver 118 through the pair of support rods 120. The rotation of the pulley driver 118 thus slows down or speeds up the rotational speed of the adjustment pulley 72.

The direction of this rotational movement depends upon the direction of linear movement of the adjustment bracket 104. The movement of the adjustment bracket 104 can thus cause the relative movement of the adjustment disc relative to the drive disc 40. As described previously, the relative movement of the adjustment disc 42 relative to the drive disc 40 controls the distance between the knife blades. The relative movement of the adjustment disc 42 relative to the drive disc 40 causes the knife blades 16 to move toward or away from each other in a direction perpendicular to the wire axis.

Figure 8:
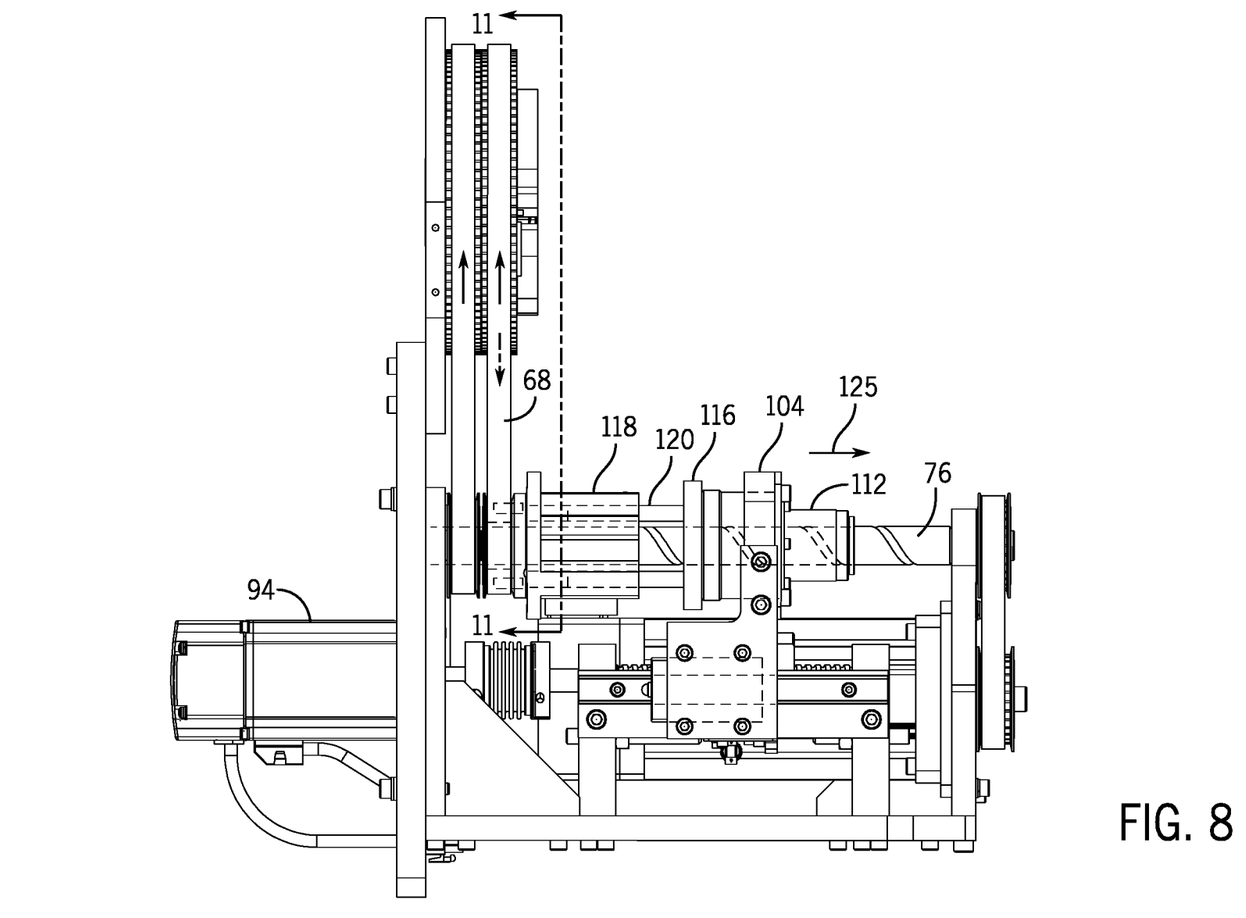
FIG. 8 is a top view showing the operation of the adjustment drive assembly to modify operation of the circular cutting unit.
Figure 9:
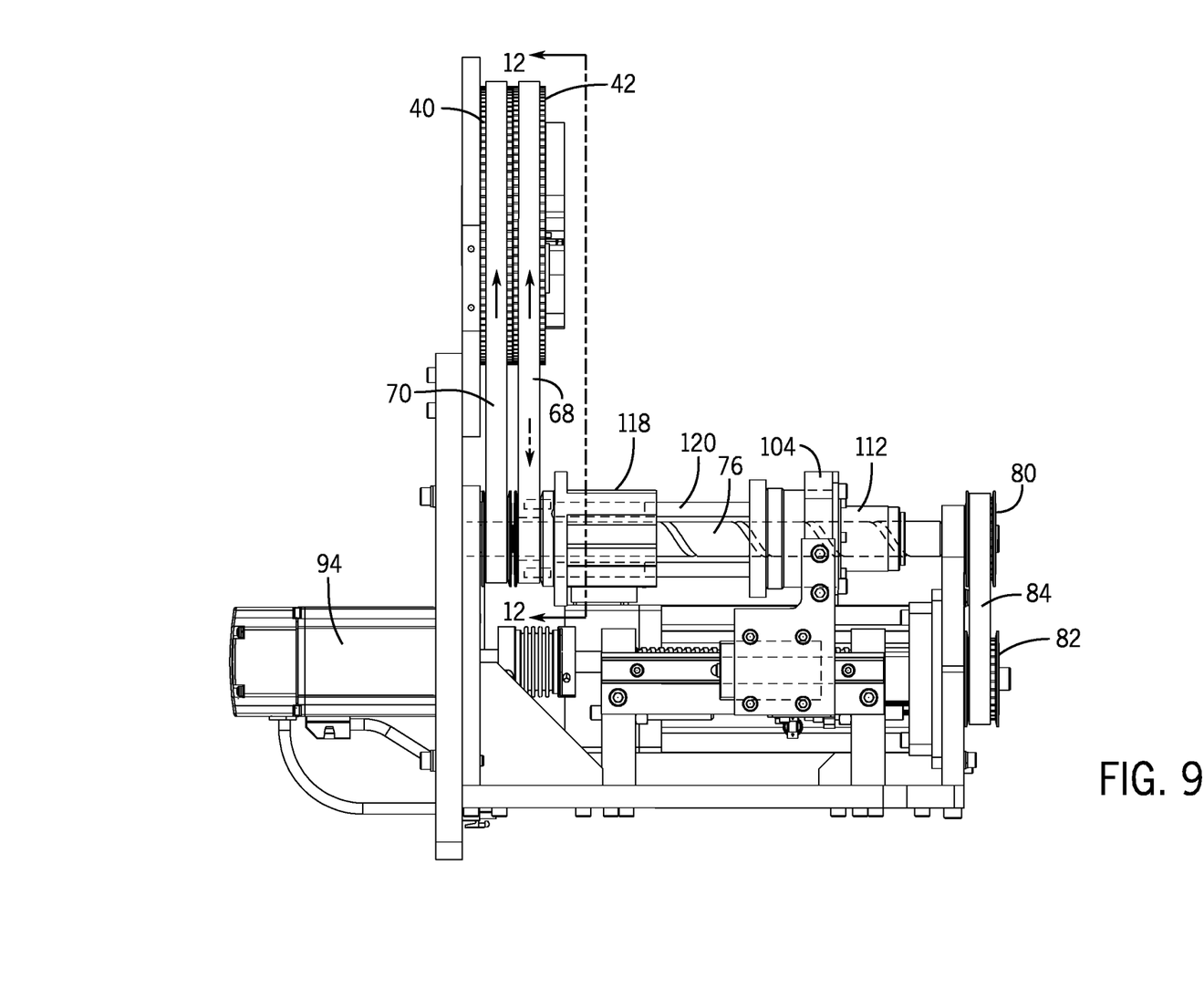
FIG. 9 is a top view similar to FIG. 8 showing the operation of the adjustment drive assembly.
Figure 10:
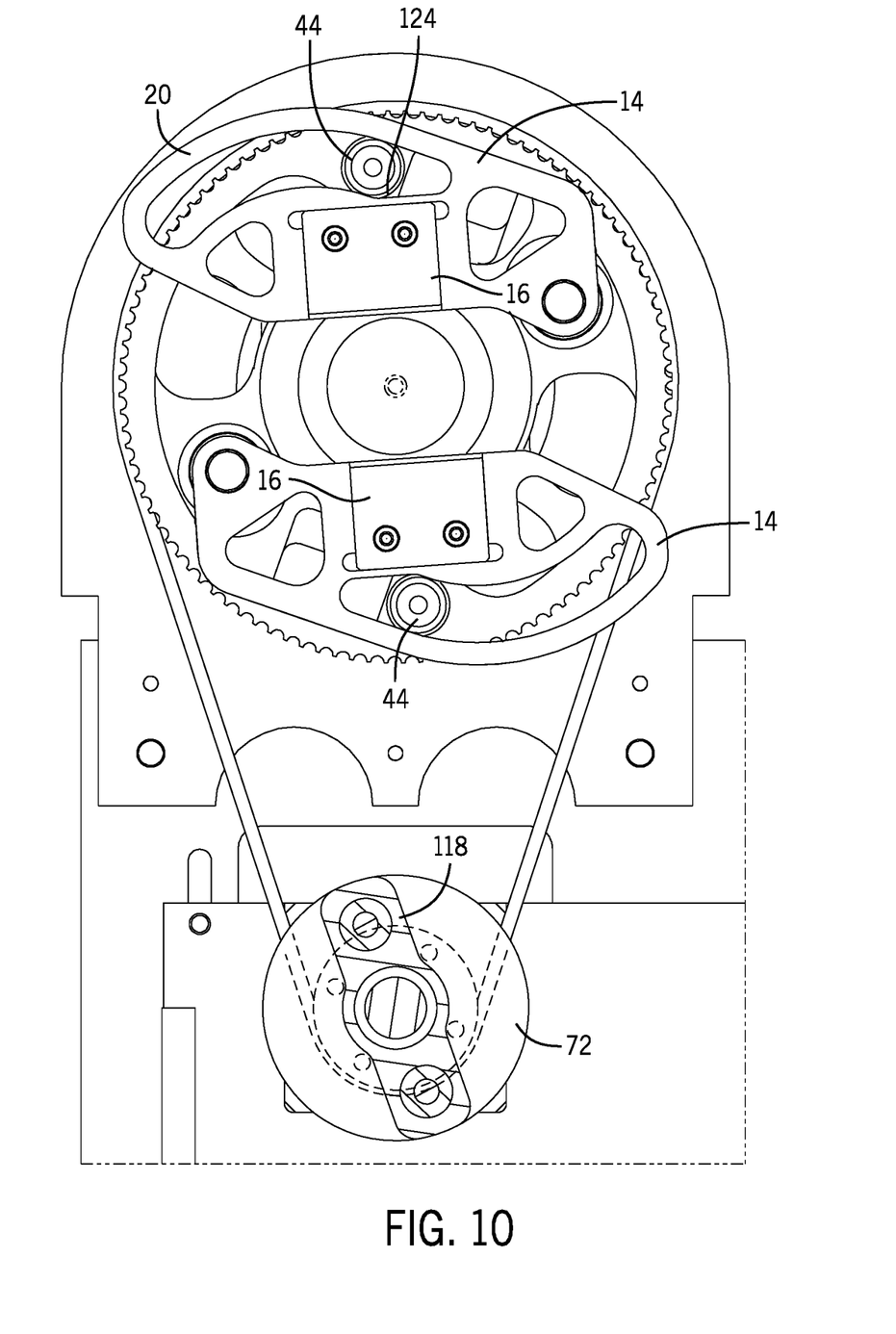
FIG. 10 is a side view of the knife head showing the cutting blades in a fully retracted position.

Referring now to FIGS. 8-12, the operation of both the primary drive assembly and the adjustment drive assembly in modifying the distance between the pair of cutting blades will now be described. Referring first to FIG. 10, the fully retracted position of the pair of knife holders 14 is illustrated. In this retracted position, the pair of knife blades 16 are positioned at a maximum distance away from a cable 122 positioned for processing. In the retracted position, the adjusting elements 44 are positioned at an inner end 124 of the adjustment groove 20. If it is desired to close the gap between the pair of knife blades 16, the adjustment drive motor 94 shown in FIG. 8 is operated in a manner that causes the adjustment bracket 104 to move in the direction shown by arrow 125 in FIG. 8.

Figure 11:
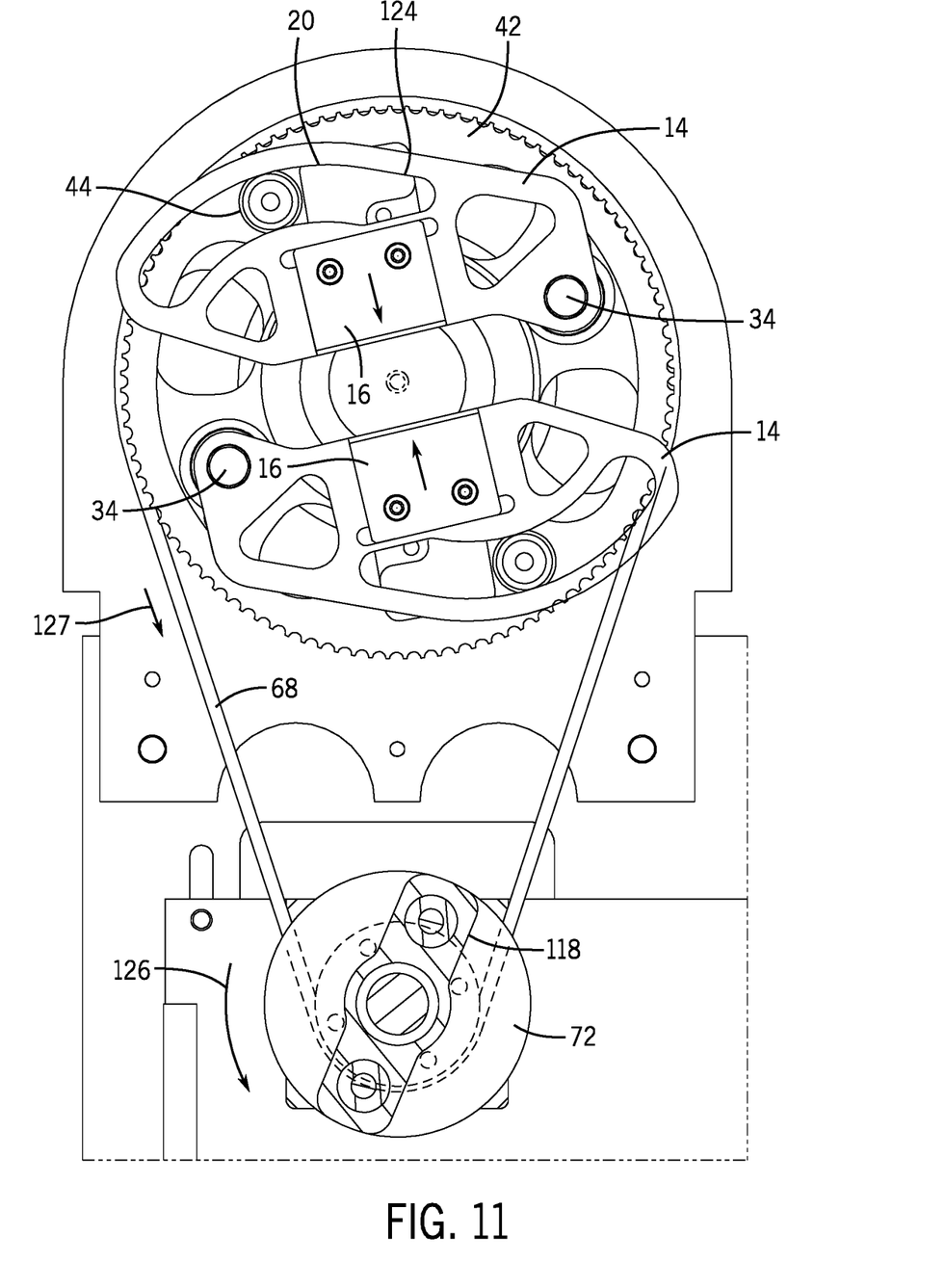
FIG. 11 is a side view taken along line 11-11 of FIG. 8 showing the movement of the cutting blades toward each other.

As the adjustment bracket 104 moves in the direction shown by arrow 125, such movement causes the pulley driver 118 to rotate. FIG. 11 shows such rotation of the pulley driver 118. In the embodiment shown in FIG. 11, the pulley driver 118, and thus the adjustment pulley 72, rotates in a counterclockwise direction, as shown by arrow 126. The counterclockwise rotation of the adjustment pulley 72 causes relative movement of the pulley belt 68 in the direction shown by arrow 127. The movement of the pulley belt 68 causes the adjustment disc 42 to rotate in the counterclockwise direction. Such rotation of the adjustment disc 42 relative to the drive disc causes the adjusting element 44 to move away from the inner end 124 of the adjustment groove 20 as illustrated in FIG. 11. The movement of the adjusting element 44 within the adjustment groove 20 causes the knife blades 16 to move toward each other. In the embodiment illustrated, such linear movement of the knife blades 16 is caused by the pivoting movement of each of the knife holders 14 about the pivot pin 34 mounting the first end of the knife holder 14 to the drive disc. In alternate embodiments, the knife holders can have different configurations that also allow for the linear movement of the knife blades 16 as was discussed above.

Figure 12:
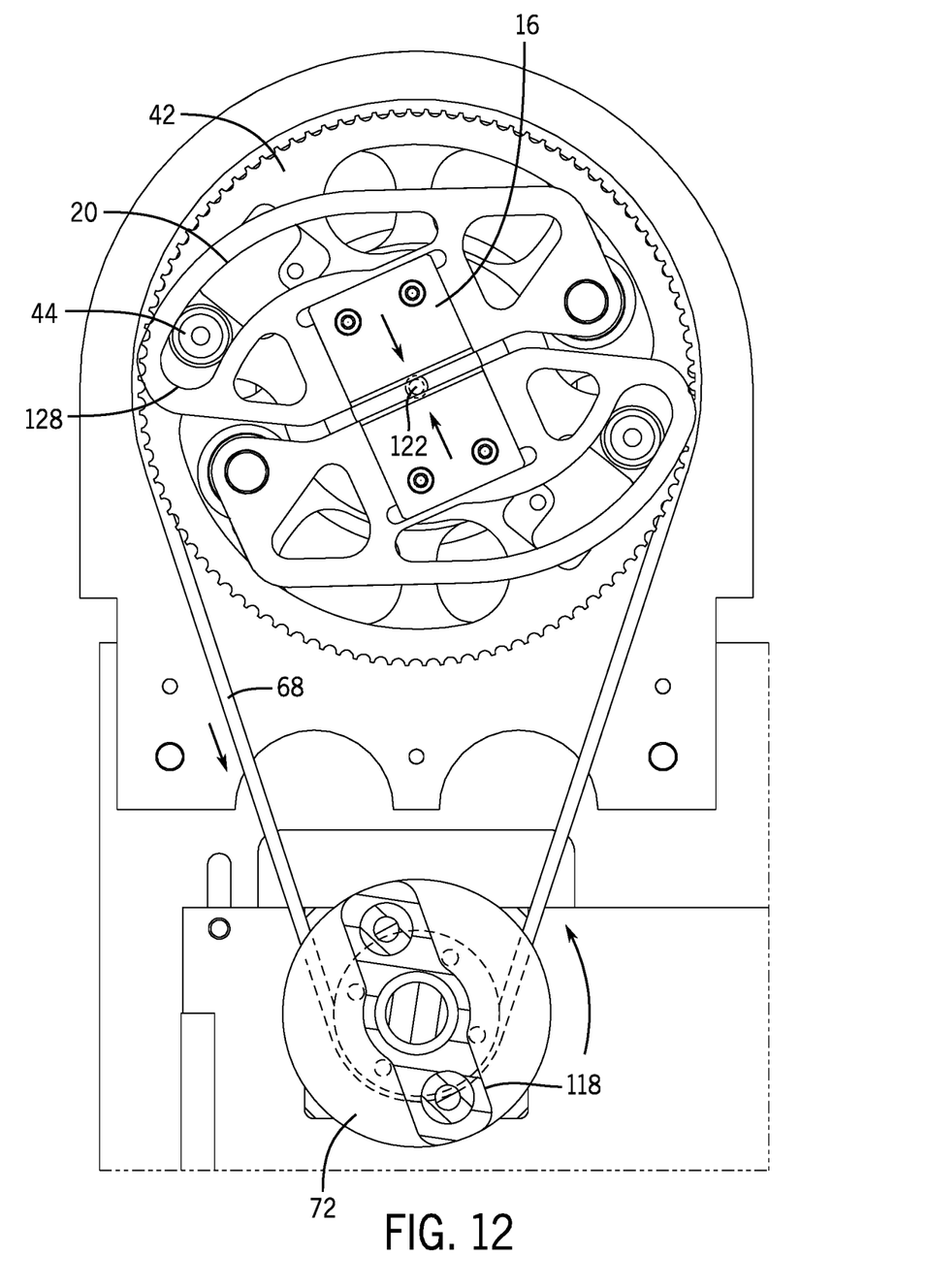
FIG. 12 is a side view taken along line 12-12 of FIG. 9 showing the further movement of the cutting blades toward a final cutting position.

FIGS. 9 and 12 illustrate further operation of the adjustment drive motor 94 to cause further rotation of the pulley driver 118 and the connected adjustment pulley 72 in the counterclockwise direction. Again, this rotation results in similar movement of the pulley belt 68 and thus further counterclockwise movement of the adjustment disc 42 relative to the drive disc. This further rotation causes the adjusting elements 44 to move further along the adjustment groove 20 toward the outer end 128 of the adjustment groove 20. As can be seen in FIG. 12, such movement causes the knife blades 16 to move toward each other in a cutting plane that is perpendicular to the cable axis. As illustrated in FIG. 12, the knife blades 16 move close enough to each other to engage the cable 122 to cut one or more outer layers of the cable 122. As can be understood in FIGS. 11 and 12, although relative movement of the adjustment disc 42 relative to the drive disc is shown and described, it should be understood that both the adjustment disc 42 and drive disc 40 are rotating at the cutting speed as the adjustment disc 42 is moved relative to the drive disc.

Once the cutting blades 16 are in the desired location, both the drive disc and adjustment disc continue to rotate at the cutting speed to cut through the outer layers of the cable 122. The movement of the cutting blades 16 is controlled by the operation of the adjustment motor. The adjustment motor is a high precision electric motor that is bi-directional and is controlled by a control unit as is conventional. As an example, the adjustment motor could be a stepper motor or a servo motor that is controlled by a control unit in a conventional manner. Once a complete cut has been created, the adjustment motor 94 is operated in a reverse direction to cause the cutting blades 16 to move from the cutting position shown in FIG. 12 back to the retracted position shown in FIG. 10. In this manner, the operation of the adjustment drive motor 94 can be controlled to accurately control the movement of the cutting blades to a precise cutting location such as shown in FIG. 12.

Figure 13:
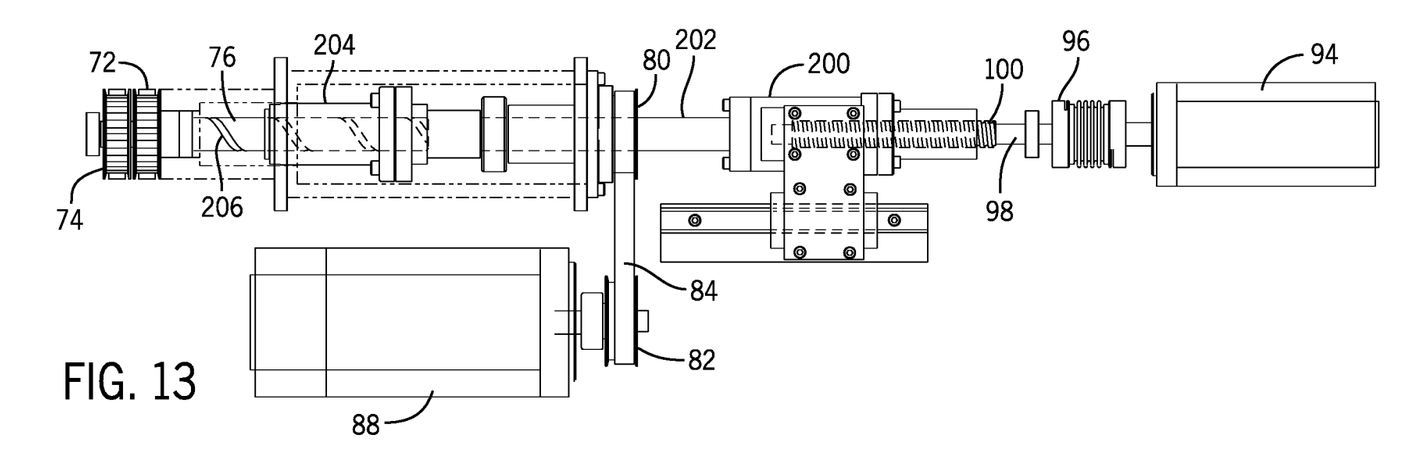
FIG. 13 is a top view showing an alternate configuration of the primary drive assembly and the adjustment drive assembly.
Figure 14:
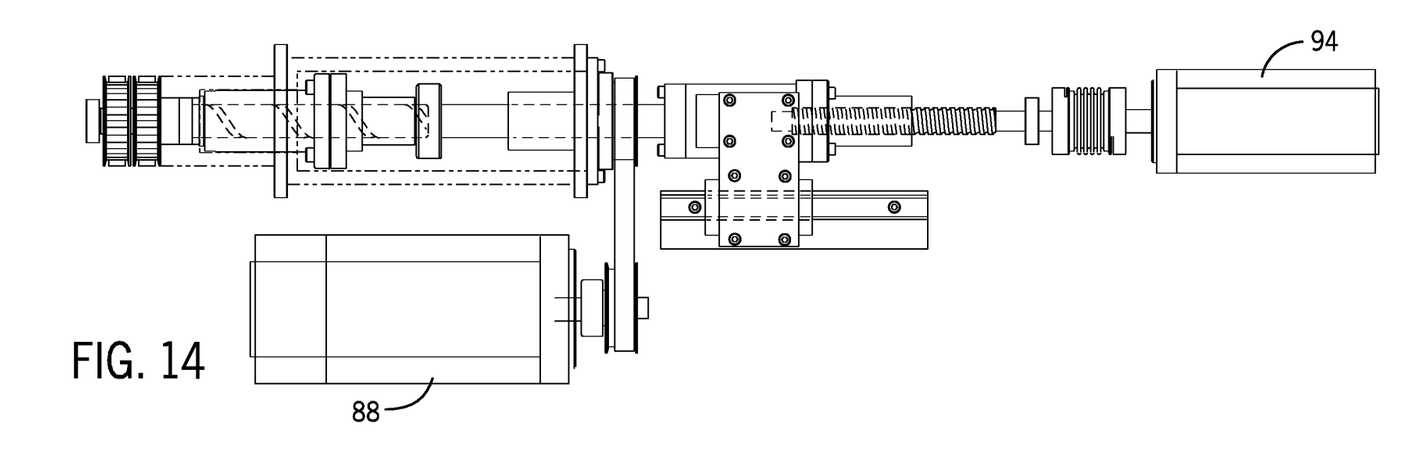
FIG. 14 is a top view showing the alternate configuration of FIG. 13 during operation of the adjustment drive assembly.

FIGS. 13 and 14 illustrate an alternate embodiment of the circular cutting unit of the present disclosure. In the alternate embodiment shown in FIGS. 13 and 14, the location and configuration for the connection of both the primary drive motor 88 and the adjustment drive motor 94 is illustrated. In this alternate embodiment, the primary drive motor 88 is connected to the motor drive pulley 82 and the idler pulley 80 through the belt 84. In this manner, the primary drive motor 88 drives the rotation of the similar primary drive shaft 76. The primary drive shaft 76 is connected to both the drive pulley 74 and the adjustment pulley 82. The drive pulley 74 and adjustment pulley 72 are connected to the same pulley belts as described previously.

In the embodiment shown in FIGS. 13 and 14, the adjustment drive motor 94 is connected in a linear relationship to the primary drive shaft 76. The adjustment drive motor 94 is connected to the shaft coupler 96 and a similar adjustment shaft 98. However, when the adjustment shaft 98 rotates, a coupler 200 moves along the threaded outer surface 100 of the adjustment shaft 98. The coupler 200 includes a coupler shaft 202 that is connected to a ball nut 204. The ball nut 204 includes an internal pin or ball that moves along the spiral groove 206. The movement of the ball nut 204 as illustrated in a comparison of FIGS. 13 and 14 imparts the desired rotational movement of the adjustment pulley 72 in the same manner as described in the first embodiment. In this manner, the operation of the adjustment drive motor 94 can selectively rotate the adjustment pulley 72 in either a clockwise or counterclockwise direction depending upon the desired movement of the knife blades 16.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A circular cutting unit operable to partially cut a cable along a cutting plane that is perpendicular to a cable axis comprising:

a drive disc rotatable about the cable axis;

a pair of knife holders mounted to the drive disc, each of the knife holders configured to receive and retain a knife blade, each of the knife holders including an adjustment groove formed in a body of the knife holder; and an adjustment disc rotatable about the cable axis, the adjustment disc including a pair of adjusting elements that are each received in one of the adjustment grooves formed in the body of one of the knife holders, wherein a relative change in an angle of the adjustment disc relative to the drive disc causes movement of the knife blades in the cutting plane toward or away from each other.

2. The circular cutting unit of claim 1 wherein each of the knife holders is pivotally mounted to the drive disc at a first end such that the relative change in the angle of the adjustment disc relative to the drive disc causes the knife holders to pivot about the first end.

3. The circular cutting unit of claim 2 wherein the adjustment groove is substantially arc-shaped.

4. The circular cutting unit of claim 3 wherein the adjusting elements move along the adjustment groove such that the pivoting of the knife holders move the knife blades along in the cutting plane.

5. The circular cutting unit of claim 4 wherein the adjusting elements are rollers.

6. The circular cutting unit of claim 1 further comprising a primary drive assembly operable to rotate the drive disc and the adjustment disc at a cutting speed.

7. The circular cutting unit of claim 6 wherein the primary drive assembly includes an electric drive motor coupled to both the drive disc and the adjustment disc such that the drive disc and the adjustment disc rotate at the same speed.

8. The circular cutting unit of claim 7 further comprising an adjustment drive assembly coupled to the adjustment disc such that operation of the adjustment drive assembly during an adjustment period modifies the position of the adjustment disc relative to the drive disc.

9. A circular cutting unit operable to partially cut a cable along a cutting plane that is perpendicular to a cable axis comprising:

a drive disc rotatable about the cable axis;

a pair of knife holders mounted to the drive disc, each of the knife holders configured to receive and retain a knife blade;

an adjustment disc rotatable about the cable axis, the adjustment disc including a pair of adjusting elements that each engage one of the knife holders;

a primary drive assembly operable to rotate the drive disc and the adjustment disc at a cutting speed; and an adjustment drive assembly coupled to the adjustment disc, wherein operation of the adjustment drive assembly modifies a rotation speed of the adjustment disc relative to the rotational cutting speed of the drive disc for an adjustment period to create a change in an angle of the adjustment disc relative to the drive disc to cause movement of the knife blades in the cutting plane toward or away from each other.

10. The circular cutting unit of claim 9 wherein each of the knife holders is pivotally mounted to the drive disc at a first end such that the relative change in the angle of the adjustment disc relative to the drive disc causes the knife holders to pivot about the first end.

11. The circular cutting unit of claim 9 wherein the primary drive assembly includes a drive pulley connected to the drive disc by a first pulley belt and an adjustment pulley connected to the adjustment disc by a second pulley belt, wherein the drive pulley and the adjustment pulley are rotationally coupled to a primary drive shaft rotated at a cutting speed by a primary drive motor.

12. The circular cutting unit of claim 11 wherein the adjustment drive assembly is coupled to the adjustment pulley, wherein the adjustment drive assembly is operable to modify the rotational speed of the adjustment pulley.

13. The circular cutting unit of claim 12 wherein the primary drive shaft includes a spiral groove and the adjustment drive assembly includes a ball nut movable along the spiral groove.

14. The circular cutting unit of claim 13 wherein the adjustment drive assembly is operable to move the ball nut along the primary drive shaft such that movement along the primary drive shaft rotates the ball nut and the ball nut is coupled to the adjustment pulley.

15. A circular cutting unit operable to partially cut a cable along a cutting plane that is perpendicular to a cable axis comprising:

a drive disc rotatable about the cable axis;

a pair of knife holders pivotally mounted to the drive disc, each of the knife holders configured to receive and retain a knife blade, each of the knife holders including an adjustment groove formed in a body of the knife holder;

an adjustment disc rotatable about the cable axis, the adjustment disc including a pair of adjusting elements that are each received in one of the adjustment grooves formed in the body of one of the knife holders;

a primary drive assembly operable to rotate the drive disc and the adjustment disc at a cutting speed; and an adjustment drive assembly coupled to the adjustment disc, wherein operation of the adjustment drive assembly modifies a rotation speed of the adjustment disc relative to the rotational cutting speed of the drive disc during an adjustment period to create a change in an angle of the adjustment disc relative to the drive disc to cause movement of the knife blades in the cutting plane toward or away from each other.

16. The circular cutting unit of claim 15 wherein each of the knife holders is pivotally mounted to the drive disc at a first end such that the relative change in the angle of the adjustment disc relative to the drive disc causes the knife holders to pivot about the first end.

17. The circular cutting unit of claim 15 wherein the adjusting elements move along the adjustment groove such that the pivoting of the knife holders move the knife blades along in the cutting plane.

18. The circular cutting unit of claim 15 wherein the primary drive assembly includes a drive pulley connected to the drive disc by a first pulley belt and an adjustment pulley connected to the adjustment disc by a second pulley belt, wherein the drive pulley and the adjustment pulley are rotationally coupled to a primary drive shaft rotated at the cutting speed by a primary drive motor.

19. The circular cutting unit of claim 18 wherein the adjustment drive assembly is coupled to the adjustment pulley, wherein the adjustment drive assembly is operable to modify the rotational speed of the adjustment pulley.

20. The circular cutting unit of claim 19 wherein the primary drive shaft includes a spiral groove and the adjustment drive assembly includes a ball nut movable along the spiral groove.

* * * * *